(12) United States Patent
Trindade et al.

(10) Patent No.: US 12,194,833 B2
(45) Date of Patent: Jan. 14, 2025

(54) SUPPORT FRAME FOR VEHICLE HEAT EXCHANGERS USING FASTENING MEANS

(71) Applicant: Valeo Systemes Thermiques, Le Mesnil Saint Denis (FR)

(72) Inventors: José Trindade, Le Mesnil Saint-Denis (FR); Rémi Tournois, Le Mesnil Saint-Denis (FR); Fabien Bireaud, Le Mesnil Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 295 days.

(21) Appl. No.: 17/414,857

(22) PCT Filed: Dec. 20, 2019

(86) PCT No.: PCT/FR2019/053257
§ 371 (c)(1),
(2) Date: Jun. 16, 2021

(87) PCT Pub. No.: WO2020/128395
PCT Pub. Date: Jun. 25, 2020

(65) Prior Publication Data
US 2022/0063393 A1    Mar. 3, 2022

(30) Foreign Application Priority Data
Dec. 20, 2018 (FR) .................. 1873464

(51) Int. Cl.
*B60K 11/04* (2006.01)
*F28D 1/04* (2006.01)
(Continued)

(52) U.S. Cl.
CPC ............ *B60K 11/04* (2013.01); *F28D 1/0435* (2013.01); *F28F 9/002* (2013.01); *F28F 9/013* (2013.01)

(58) Field of Classification Search
CPC ....... B60K 11/04; B60K 11/06; F28D 1/0435; F28D 1/04; F28F 9/002; F28F 2280/00;
(Continued)

(56) References Cited

U.S. PATENT DOCUMENTS 5,671,803 A * 9/1997 Tepas ................ F28F 9/002
165/41
6,155,335 A * 12/2000 Acre ................. F28F 9/002
123/41.58
(Continued)

FOREIGN PATENT DOCUMENTS

CN        1891519 A        1/2007
CN    209395578 U  *     9/2019
(Continued)

OTHER PUBLICATIONS

International Search Report and Written Opinion issued in corresponding International Patent Application No. PCT/FR2019/053257, mailed on Apr. 29, 2020 (11 pages).
(Continued)

*Primary Examiner* — Harry E Arant
(74) *Attorney, Agent, or Firm* — Osha Bergman Watanabe & Burton LLP

(57) ABSTRACT

The subject of the present invention is a thermal system (1) for a motor vehicle, comprising a one-piece frame (2) comprising a front face (20) and a rear face (22), wherein the frame comprises, on each of its two faces (20, 22), fastening means (29, 30) for at least one heat exchanger (8, 10), said fastening means being such that first fastening means (29) positioned on a front face (20) of the frame are configured for fastening a heat exchanger (8) in a first direction of insertion (Ia) and that second fastening means (30) positioned on a rear face (22) of the frame are configured for
(Continued)

fastening a heat exchanger (10) in a second direction of insertion (Ib) opposed to the first direction of insertion.

11 Claims, 7 Drawing Sheets

(51) Int. Cl.
    *F28F 9/00*     (2006.01)
    *F28F 9/013*     (2006.01)

(58) Field of Classification Search
    CPC ............... F28F 2280/02; F28F 2280/04; F28F 2280/06; F28F 2280/08; F28F 2280/10; F28F 2280/105; F28F 9/0135; F28F 2009/004; B60Y 2410/113
    See application file for complete search history.

(56) References Cited

U.S. PATENT DOCUMENTS

| | | |
|---|---|---|
| 6,470,961 B1 | 10/2002 | Case |
| 2002/0070003 A1 | 6/2002 | Lenz et al. |
| 2003/0051858 A1* | 3/2003 | Sasano ................. B62D 25/084 |
| | | 165/44 |
| 2004/0188061 A1* | 9/2004 | Beck ...................... B60K 11/04 |
| | | 165/149 |
| 2004/0200598 A1* | 10/2004 | Hitt ........................ B60K 11/04 |
| | | 165/69 |
| 2015/0047808 A1* | 2/2015 | Takahashi ............... F28F 9/002 |
| | | 165/67 |
| 2016/0001629 A1* | 1/2016 | Rohr ...................... B60K 11/04 |
| | | 165/76 |
| 2018/0015958 A1* | 1/2018 | Nagayoshi ............. B60K 11/04 |
| 2019/0100096 A1* | 4/2019 | Herlem ................ B62D 25/085 |

FOREIGN PATENT DOCUMENTS

| | | | | |
|---|---|---|---|---|
| EP | 0956991 A1 * | 11/1999 | ............ | B60K 11/04 |
| EP | 1120620 A1 | 8/2001 | | |
| EP | 2333266 A2 * | 6/2011 | ............ | B60K 11/04 |
| GB | 2373571 A | 9/2002 | | |
| JP | 2006290247 A | 10/2006 | | |

OTHER PUBLICATIONS

Office Action issued in counterpart Chinese Application No. 201980092412.3, dated Sep. 22, 2023 (6 pages).

* cited by examiner

[Figure 1]
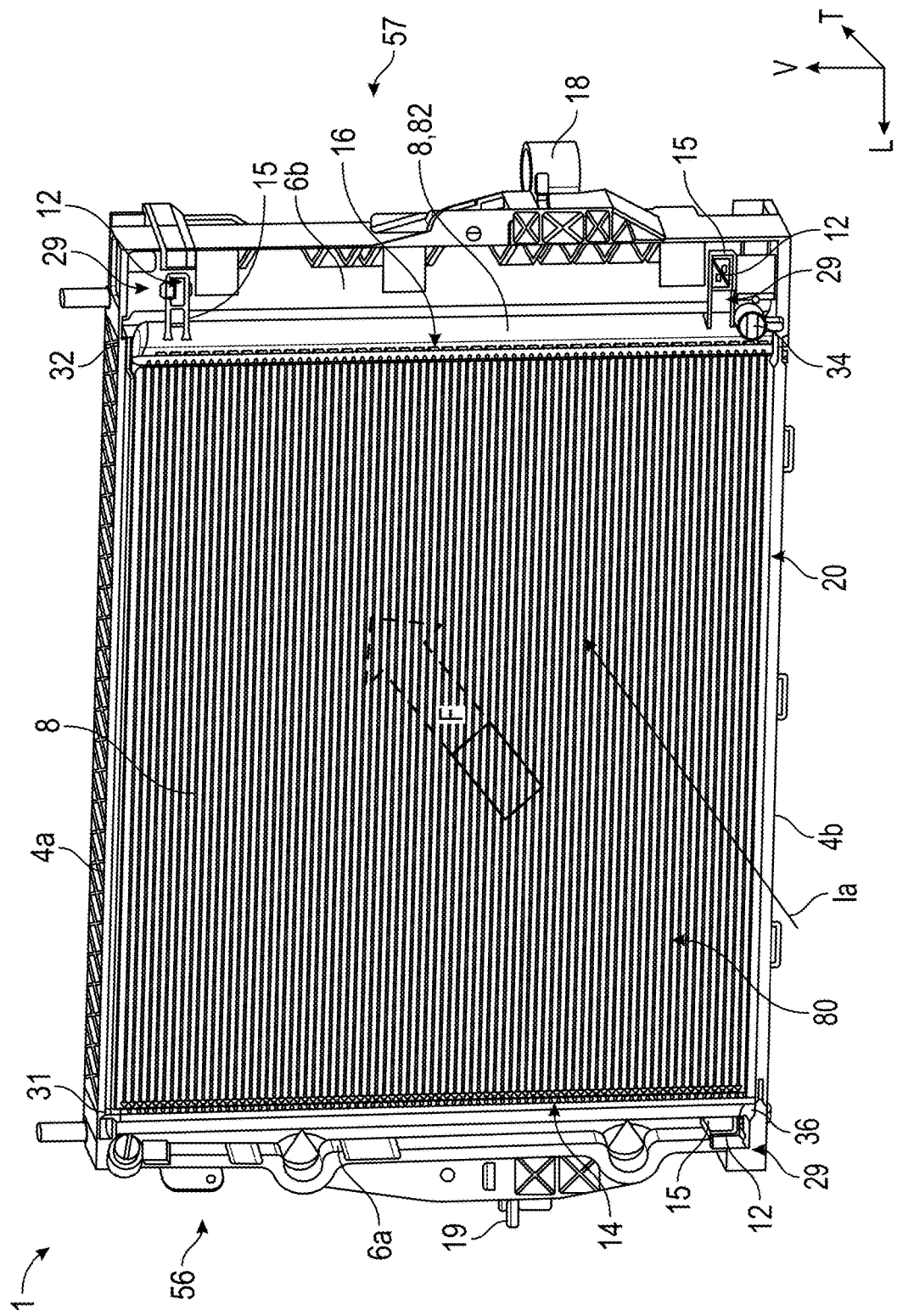

[Figure 2]
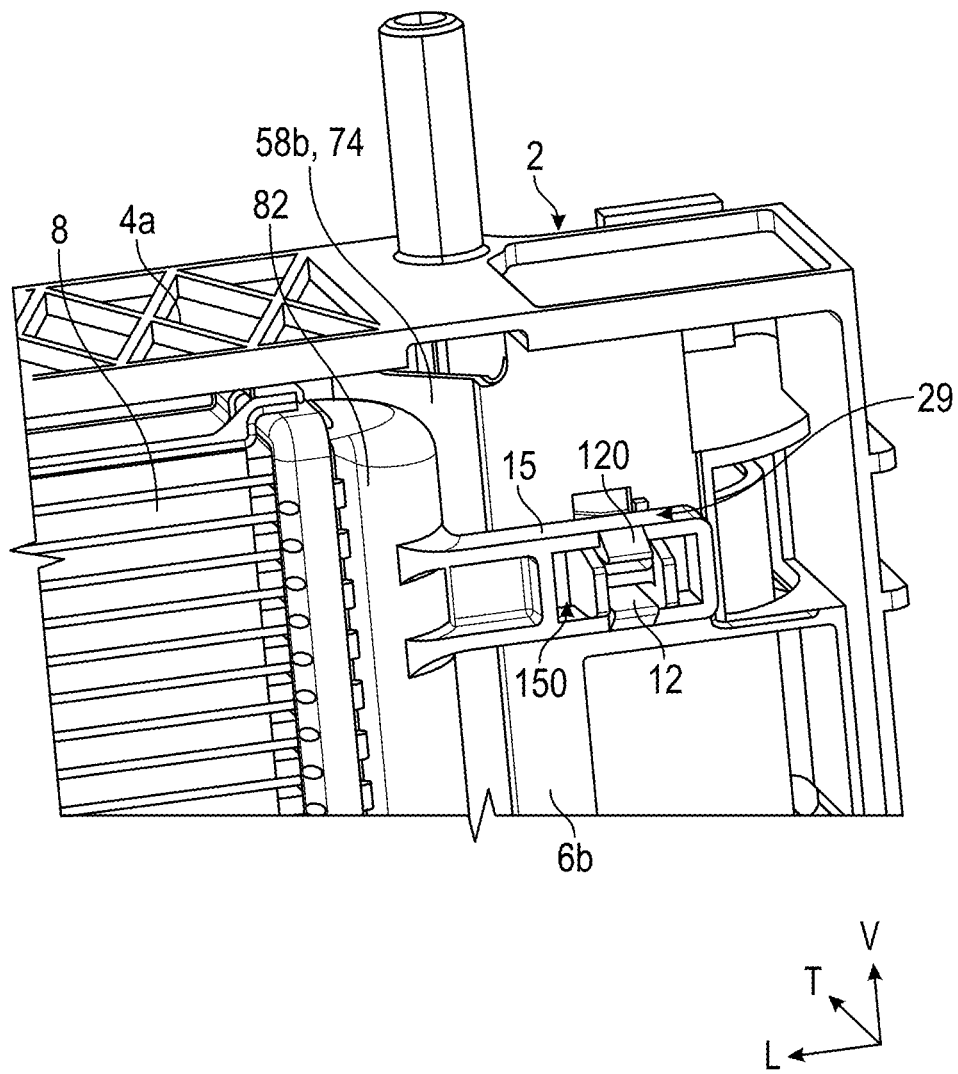

[Figure 3]
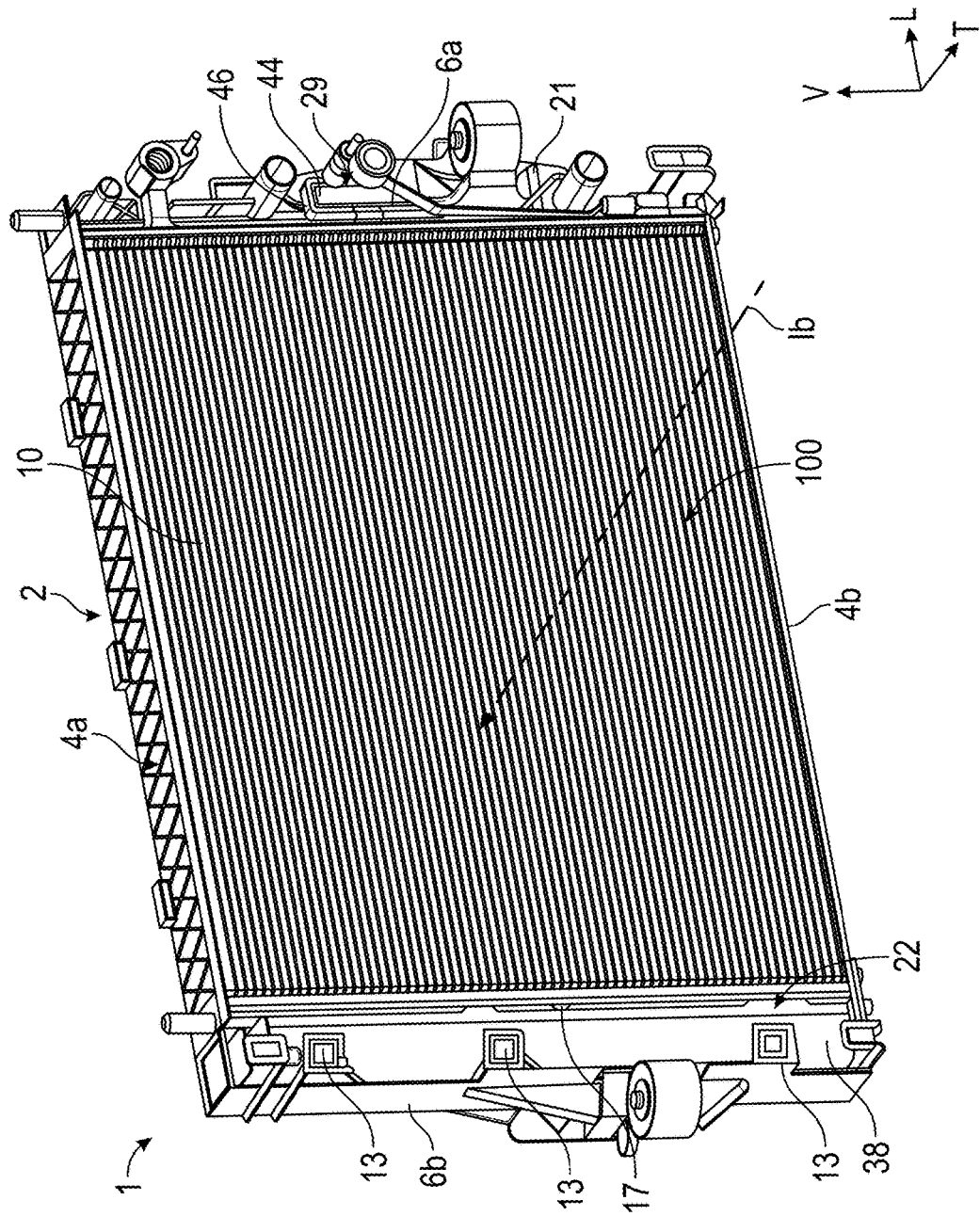

[Figure 4]
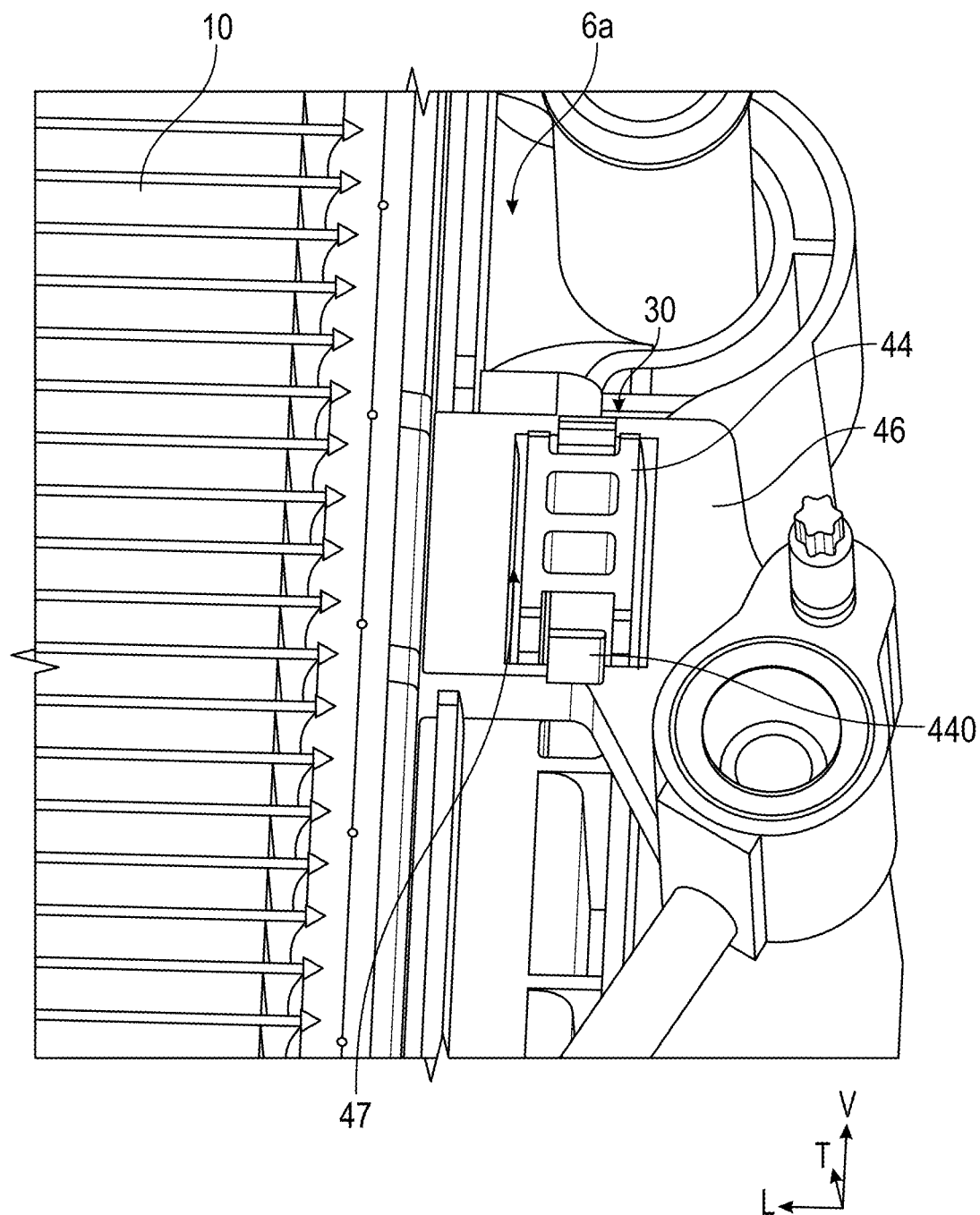

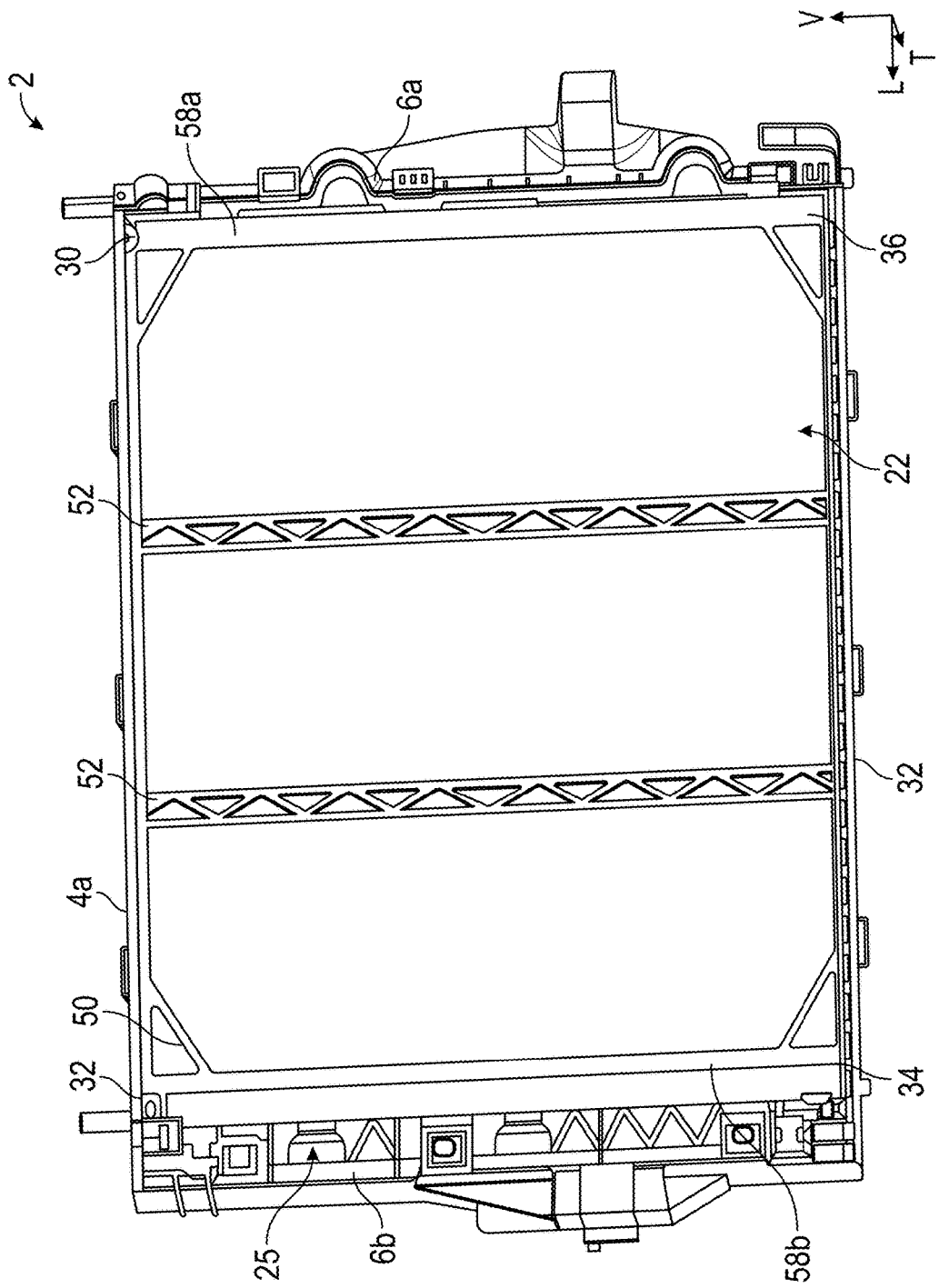
[Figure 5]

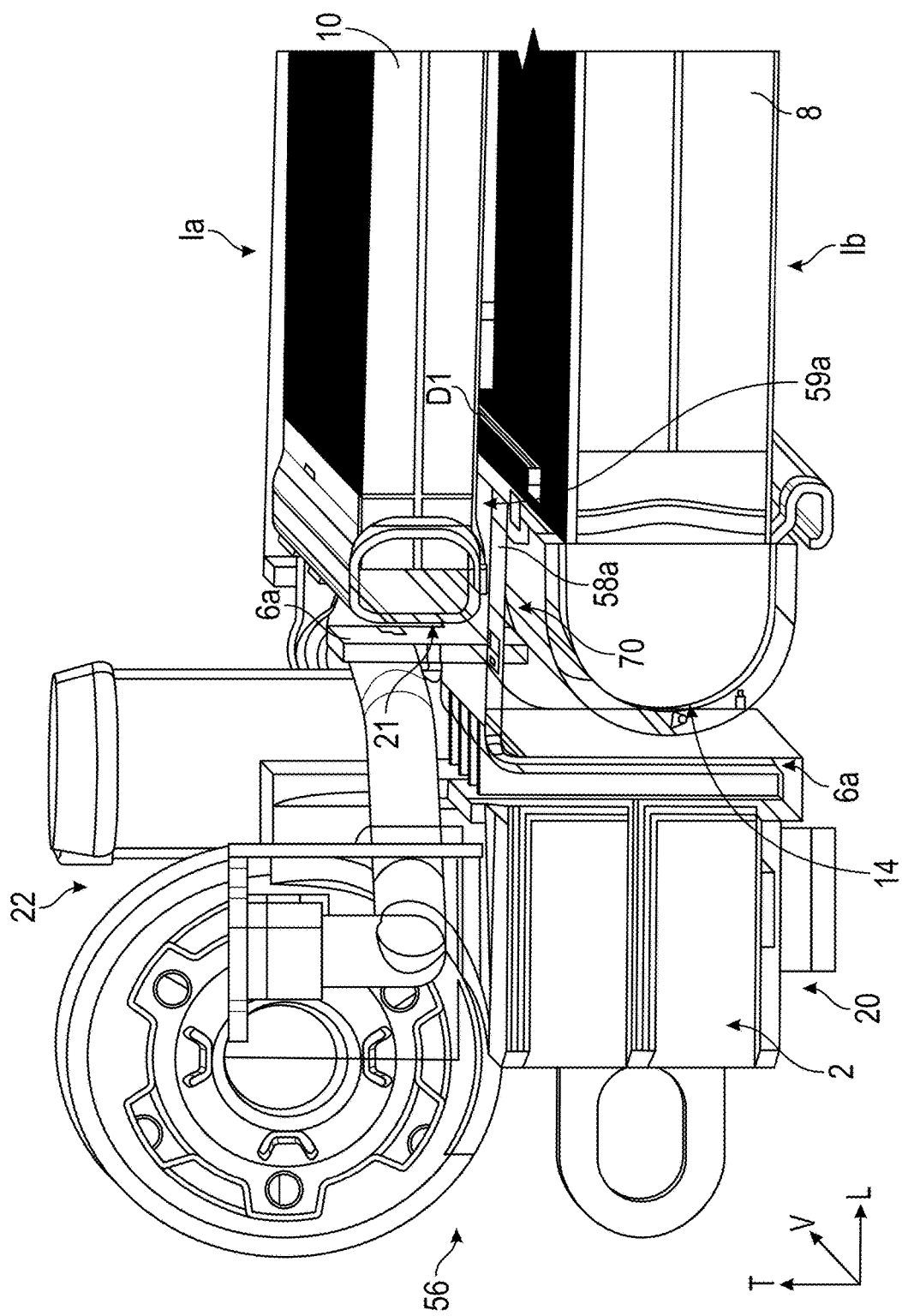
[Figure 6]

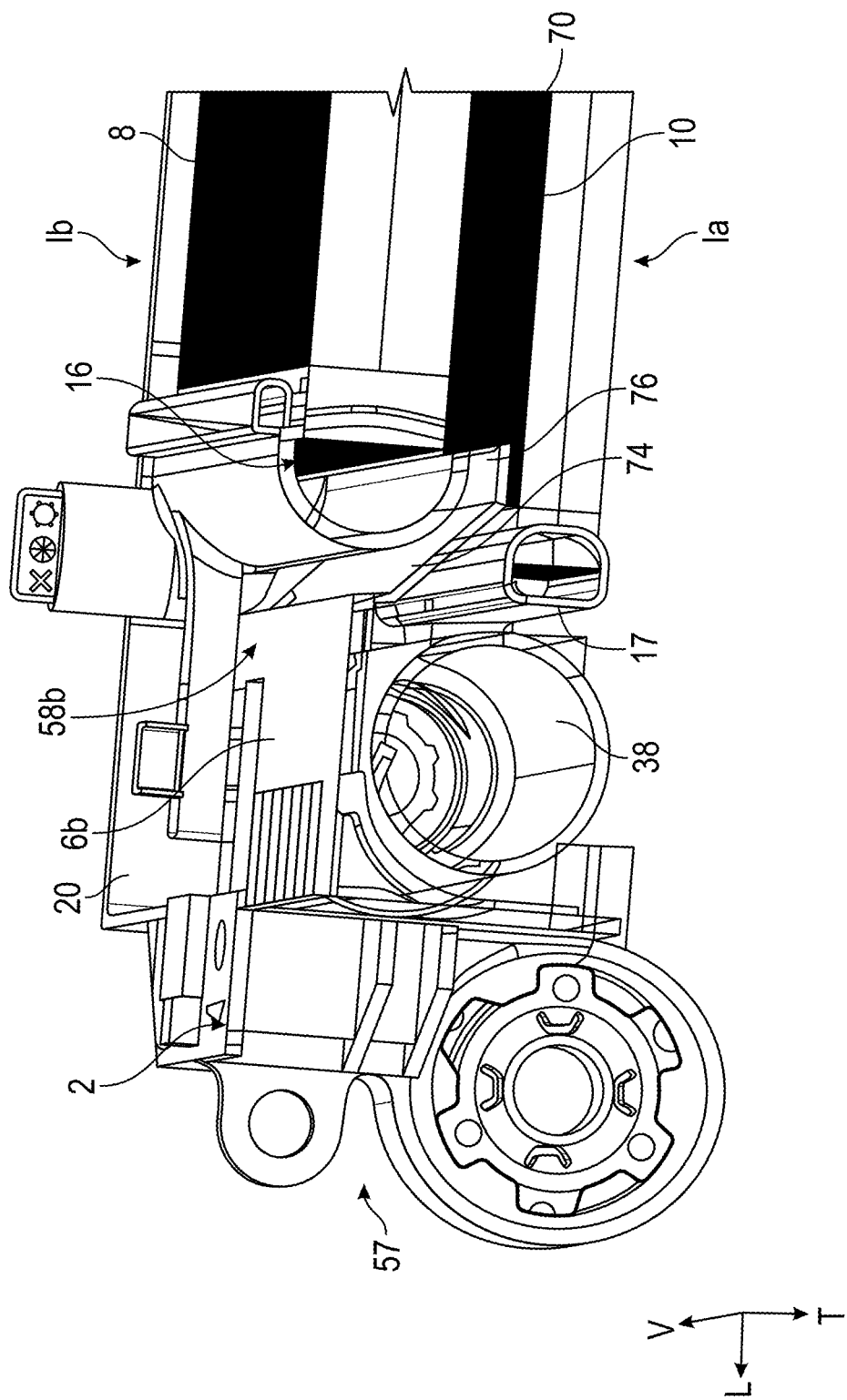
[Figure 7]

SUPPORT FRAME FOR VEHICLE HEAT EXCHANGERS USING FASTENING MEANS

BACKGROUND

The field of the present invention is that of thermal systems for motor vehicles, more particularly thermal systems that can be fitted to the front face of a vehicle, and notably of an electric motor vehicle.

The normal operation of a motor vehicle requires the supply of a large amount of air for cooling all the members required for the operation of the vehicle, notably for cooling the electric motors and/or combustion engines, and those required for maintaining the temperature of the vehicle interior. This large amount of air is, notably, captured by the front face of the vehicle, and some of the captured air flow is taken through a thermal system placed between the front face of the vehicle and the engine of the vehicle, before being admitted into the engine to enable the fuel to be burnt. Thermal systems are configured to allow an exchange of heat between the air flow passing through them and various fluids circulating through heat exchangers such as radiators or condensers. The fluid or fluids cooled in this way are used for air conditioning circuits of the vehicle interior, and/or for circuits for cooling components of the vehicle such as batteries.

It is known to provide thermal systems with multiple heat exchangers with a supporting frame for each of these heat exchangers. In order to facilitate the operations of manufacturing the components of the thermal system, and to facilitate the operations of assembling the various exchangers and controlling the final position of each exchanger relative to the others, it is known to provide a one-piece supporting frame. Heat exchangers are conventionally fastened to the frame by insertion via the same face of the frame. The frame has an open face through which the exchangers are successively inserted, a first heat exchanger being inserted to bear against the back of the frame and a second heat exchanger being made to overlap the first heat exchanger by being fastened to the frame and/or to the first heat exchanger.

Additionally, to optimize the performance of the thermal systems, it is desirable for a maximum amount of air to pass through each of the heat exchangers. When the different heat exchangers of a thermal system are fastened to a frame, it is thus desirable and known to provide sealing means between the frame and the heat exchangers to limit air leaks between the exchangers and the frame of the thermal system. Evidently, such leaks reduce the amount of air passing through the exchange surface of the heat exchangers, adversely affecting thermal performance. It is known, notably, to place flexible sealing gaskets around the whole of the periphery of the heat exchanger through which the air flow first passes, and to make these sealing gaskets bear against the side walls of the frame. However, such a configuration does not prevent the leakage of air between the exchanger and the side walls of the frame after the air has passed through the first of the heat exchangers.

SUMMARY

The invention lies within this double context, and is intended to propose a thermal system which, in the first place, enables the different heat exchangers to be mounted in a simple and reliable way on the same one-piece supporting frame.

The invention relates to a thermal system for a motor vehicle, comprising a one-piece frame composed primarily of two side walls parallel to each other and two longitudinal walls parallel to each other and extending perpendicularly to the two side walls, the frame comprising a front face and a rear face, characterized in that the frame comprises, on each of its two faces, fastening means for at least one heat exchanger, said fastening means being such that first fastening means positioned on a front face of the frame are configured for fastening a heat exchanger in a first direction of insertion, and that second fastening means positioned on the rear face of the frame are configured for fastening a heat exchanger in a second direction of insertion opposed to the first direction of insertion.

The invention makes use of a one-piece frame, providing for the advantageous fastening of at least two heat exchangers by means of a single component which is simply and economically produced by a single manufacturing operation. This fastening is advantageous in that such an arrangement enables the distance between the two heat exchangers to be controlled after their respective assembly onto the frame, while reducing the chains of dimensions, since the frame serves as a common reference for the fastening of the two heat exchangers via each of its faces. According to the invention, as will be apparent, the dimensions to be taken into account for the assembly of the second heat exchanger onto the frame relate solely to the manufacturing clearances of the frame, of the second heat exchanger and of the fastening means integrated into these two elements, without consideration of the manufacturing clearances of the first heat exchanger, by contrast with an assembly in which the heat exchangers are stacked on each other on the same side of the frame.

According to a characteristic of the invention, the first fastening means and the second fastening means are configured for fastening their respective heat exchangers to the frame in a transverse direction, perpendicular to a main plane of elongation of the heat exchangers in a fixed position on the frame. In other words, the two heat exchangers, each fastened to a respective one of the faces of the frame, are arranged in such a way that, after their installation on the frame, they have an axial clearance between them in a direction perpendicular to the main plane of elongation of the exchangers, that is to say in a direction parallel to a stacking direction of the heat exchangers. The axial clearance enables a space to be provided between the two heat exchangers.

Each heat exchanger may, notably, be fastened to its assigned face of the frame by snap-fitting in the transverse direction, the frame possibly comprising a corresponding snap-fitting means on only one of its side walls or on both side walls.

According to a characteristic of the invention, the first fastening means and the second fastening means comprise snap-fitting fastening means, with at least one fastening means which is elastically deformable in a direction perpendicular to the transverse direction and comprises a stop capable of locking the transverse position of the corresponding heat exchanger on the frame.

According to a characteristic of the invention, the one-piece frame comprises at least one sealing wall projecting from a side wall and/or from a longitudinal wall of the frame, said sealing wall comprising at least one free edge portion extending in a space formed transversely between the two heat exchangers. Evidently, this at least one sealing wall extends from a side wall or a longitudinal wall, substantially toward the inside of the frame.

In other words, the sealing wall extends from a side wall and has a free edge positioned inside the frame and arranged between the two heat exchangers. Such a positioning of the sealing wall between the two heat exchangers allows the formation of baffles in a lateral area of the thermal system between the exchangers and the frame, in which lateral area there may be leaks of air. The simple formation of baffles by an integration of function in the one-piece frame makes it possible to complicate the leakage of air between the heat exchangers and the side walls. Evidently, by mounting the heat exchangers on the frame on two opposite faces of the frame, in opposite directions of insertion, it is possible to provide a sealing wall having a free edge extending transversely between the heat exchangers. This arrangement, which contributes to the creation of an effective baffle because it extends far enough into the frame to have an effect on the potential deflection of the air flow, would be impossible if the heat exchangers were mounted from the same side of the frame, since the presence of such a sealing wall would impede the insertion of the first exchanger, which has to be inserted so as to bear against the back wall of the frame.

According to a characteristic of the invention, this at least one sealing wall extends in a plane parallel to the main plane of elongation of the heat exchangers. The main plane of elongation of the exchangers is taken to be the plane positioned transversely to the main direction of the air flow when the exchangers are fastened to the frame. In order to define the position of the sealing wall precisely, reference may be made to a median plane of the different main planes of elongation of the heat exchangers, or to a single median plane, for example that of the radiator.

According to the invention, the sealing wall has a thickness in the range from 2.5 mm to 3 mm. Evidently, the thickness of the sealing wall is measured in the transverse direction, and consequently this thickness must be less than a maximum threshold value so that the free edge of the sealing wall can be housed between the heat exchangers, and must be greater than a minimum threshold value so that the baffle thus formed has an obstructive effect for the purpose of preventing air leaks.

According to the invention, the sealing wall extends continuously along a side wall of the frame.

According to a characteristic of the invention, the sealing wall or walls extend so that they form an obstruction to the air flow attempting to escape from the sides of the thermal system, but without blocking the circulation of this air flow in the center of the heat exchangers. Each of the heat exchangers comprises an exchange surface delimited laterally by fluid manifolds, and the thermal system according to the invention is such that these fluid manifolds are positioned facing the side walls when the heat exchangers are fastened to the frame. According to the aforementioned characteristic of the invention, the sealing wall is designed in such a way that the free edge is positioned longitudinally facing at least one header box, so that the sealing wall does not obstruct the passage of air through the exchange surfaces of the two heat exchangers.

According to a characteristic of the invention, the at least one sealing wall is made in one piece with the frame. Thus the sealing wall or walls are formed in the same manufacturing step as the frame, for example by the injection of plastic material.

Alternatively, the at least one sealing wall may be made of a different material from the frame, for example a polymer such as polyamide, since this material has good wear resistance and good stiffness. The sealing wall may then be overmolded on the side wall of the corresponding frame, or may consist of an independent element attached to this lateral wall.

According to a characteristic of the invention, the frame comprises at least one structural wall extending between the two longitudinal walls or the two side walls of the frame, and between the at least two thermal elements. The at least one structural wall is preferably perforated to allow passage from one heat exchanger to the other for the air flow that is made to pass through the thermal system.

The at least one structural wall enables the structure of the frame to be reinforced during the mounting of the thermal system, since mounting by snap-fitting may, notably, give rise to stresses on the frame, as a result of the force that must be applied to the heat exchangers in order snap-fit them. Evidently, these structural walls are also useful during the running of the vehicle, which may generate vibrations of the frame.

According to the invention, the at least two heat exchangers are a condenser placed on the rear face of the frame and a radiator placed on the front face of the frame, the condenser and the radiator being positioned in series in a transverse direction of the air flow through the thermal system. Evidently, the front face of the frame is the face oriented toward the outside of the vehicle when the frame is mounted in the front face of the vehicle, and the radiator positioned on the front face is therefore the heat exchanger that is the first to be passed through by the air flow directed through the thermal system. "Positioned in series" is taken to mean that they are passed through successively by the same air flow.

The invention also covers a motor vehicle comprising at least one thermal system according to the above characteristics.

The invention also covers a method for assembling the thermal system as described above, wherein a first heat exchanger is positioned on the front face of the frame in a first direction of insertion, and a second heat exchanger is positioned on the rear face of the frame in a second direction of insertion, the directions of insertion being opposed to each other.

The method of assembly according to the invention is such that the heat exchangers are positioned on either side of a supporting frame, with a first heat exchanger fastened to the frame according to a first assembly procedure and a second heat exchanger fastened to the same frame according to a second assembly procedure. The first assembly procedure is concluded by fastening, by snap-fitting for example, in a first direction of insertion, for example a first direction along the transverse direction perpendicular to the main plane of elongation of the heat exchangers, and the second assembly procedure is concluded by fastening, by snap-fitting for example, in a second direction of insertion, for example a second direction opposed to the first direction along the same transverse direction perpendicular to the main plane of elongation of the heat exchangers. The assembly procedures that are concluded by fastening in the first or the second direction of insertion may consist of different types of assembly procedure. For example, the heat exchanger may be fastened on the two lateral sides of the corresponding face by the same action of translation in this direction of insertion. Alternatively, the heat exchanger may, in a first stage, be locked at a first lateral edge of the frame and then pivoted to bring the heat exchanger into a plane substantially similar to the plane in which it will extend when it has been fastened, and then, in a final second stage, may be pushed in the transverse direction of insertion so as to be finally fastened to the frame.

BRIEF DESCRIPTION OF DRAWINGS

Other characteristics, details and advantages of the invention will be more clearly apparent from a perusal of the description provided below for guidance only, with reference to the drawings, in which:

FIG. 1 is a perspective view of a thermal system according to the invention, showing a frame and its front face to which a first heat exchanger is fastened;

FIG. 2 is a close-up view of part of a side wall of the front face of the frame, showing a fastening means of the first heat exchanger;

FIG. 3 is a view of the thermal system of [FIG. 1] taken from another angle of perspective, showing the frame and its rear face, which is opposed to the front face visible in [FIG. 1], and to which a second heat exchanger is fastened;

FIG. 4 is a close-up view of part of a side wall of the rear face of the frame, showing a fastening means of the second heat exchanger;

FIG. 5 is a perspective view of the frame of the thermal system according to the invention;

FIG. 6 is a sectional view of a first longitudinal edge of the thermal system according to the invention, showing the first side wall of the frame and the two heat exchangers;

FIG. 7 is a sectional view of a second longitudinal edge of the thermal system according to the invention, showing the second side wall of the frame and the two heat exchangers.

DETAILED DESCRIPTION

It should be noted in the first place that the figures show the invention in a detailed manner for the purpose of applying the invention, said figures obviously being usable to define the invention more closely if necessary.

In the remainder of the description, the terms "longitudinal", "vertical", or "transverse" will be used to define the orientation of the thermal system according to the invention, as well as that of the frame forming part of this thermal system. More particularly, the transverse direction is the main direction of the air flow passing through the thermal system. The longitudinal and vertical directions define a main plane of elongation of one or other of the heat exchangers fastened to the frame, the longitudinal direction corresponding to the main dimension of the frame in the main plane of elongation as specified above. The aforesaid directions are, notably, indicated by a trihedron LVT shown in the figures.

The thermal system 1 according to the invention comprises a frame 2 to which are fastened at least two heat exchangers, for example a radiator 8 and a condenser 10, the frame comprising on each of its faces fastening means 29, 30 for at least one heat exchanger. As will be described more fully below, the fastening means are such that first fastening means 29 positioned on a first face of the frame are configured for fastening a heat exchanger in a first direction of fastening and second fastening means 30 positioned on a second face of the frame are configured for fastening a heat exchanger in a second direction of fastening, opposed to the first direction of fastening.

[FIG. 1] shows more particularly the front face 20 of the frame 2 to which is fastened a first of the two heat exchangers, in this case a radiator 8.

The thermal system 1 extends primarily in a longitudinal dimension, and has a first longitudinal edge 56 and a second longitudinal edge 57, opposed to the first longitudinal edge 56 about a longitudinal axis L. The thermal system is also configured for being passed through by an air flow whose main direction is transverse, according to the arrow F shown in [FIG. 1]. The air flow thus caused to pass through the thermal system originates from outside the vehicle and enters through the front face of the vehicle before entering into the thermal system. Thus a front face 20 of the frame, which is the face shown in [FIG. 1], is defined as the face that is first contacted by the air flow passing through.

The frame 2 comprises a first side wall 6a and a second side wall 6b, which are parallel to each other and extend, respectively, at each of the longitudinal edges of the thermal system 1, along a vertical axis V. The frame 2 also comprises a first longitudinal wall 4a and a second longitudinal wall 4b, which are parallel to each other and extend along the longitudinal axis L of the thermal system 1 to link the first side wall 6a and the second side wall 6b to each other. The frame 2 then has a first corner 31, a second corner 32, a third corner 34 and a fourth corner 36. "Corner" is taken to mean the part of the frame 2 where one of the longitudinal walls 4a, 4b and one of the side walls 6a, 6b meet perpendicularly. The frame 2 has a longitudinal and vertical mid-plane, in which plane it takes the form of a right-angled quadrilateral with a main dimension along the longitudinal direction L.

[FIG. 1] also shows a first ring 18 and a second ring 19. The first ring 18 is positioned on a rear face, shown in [FIG. 3], of the second side wall 6b of the frame 2, and projects on the second side wall 6b of the frame 2.

The second ring 19 is positioned on the rear face, of the first side wall 6a of the frame 2, and projects on the first lateral wall 6a of the frame 2.

The two rings 18, 19 serve for the fastening of the thermal system 1 in a motor vehicle, for example by screwing in interaction with the rings 18 and 19.

On the front face 20, shown in [FIG. 1], the frame 2 is configured to allow the fastening of the radiator 8. The radiator 8 takes the form of a parallelepiped comprising an exchange surface 80 and header chambers 82 positioned laterally on either side of this exchange surface. The radiator 8 thus comprises a first lateral edge 14 formed by a header chamber which faces the first side wall 6a when the radiator is fastened to the frame, and a second lateral edge 16 formed by a header chamber which faces the second side wall 6b of the frame 2.

In the remainder of the description, first fastening means 29 for fastening the radiator 8 to the frame 2 will be described with reference to [FIG. 1], and particularly with reference to the detail view of [FIG. 2].

The first fastening means 29 allowing the radiator to be fastened to the frame on its front face are configured to allow fastening in a first transverse direction of insertion, perpendicular to the plane of elongation of the radiator when it is assembled onto the frame.

The first fastening means 29 here take the form of snap-fitting means, configured for allowing the radiator 8 to be fastened to the frame in a transverse direction of insertion, these snap-fitting means comprising, in the illustrated case, fastening members fixed to the frame and fastening tabs fixed to the radiator and capable of interacting with the fastening members.

More precisely, the thermal system 1 is configured so that the frame comprises, on its front face 20, fastening members 12 consisting, respectively, of at least one elastically deformable blade projecting from one or other of the side walls in a transverse direction T opposed to the frame. The blade has a body which has, at its free end, a ramp shape 120 forming a support surface to generate an elastic deformation of the blade, the ramp being prolonged by a shoulder forming a stop surface for the corresponding fastening tab when the radiator is in position against the frame. In the example shown in [FIG. 2], the fastening member comprises two blades positioned in parallel, the respective ramps 120 of which are configured to cause the blades to approach each other under the effect of said elastic deformation. According to the invention, the body of each blade extends mainly in the transverse direction, and the stop surface of each blade extends substantially parallel to the main plane of elongation of the radiator when the radiator is assembled onto the frame. Thus the fastening member can be deformed by a force parallel to the transverse direction, and can lock the radiator in position along the same direction when it regains its position after an elastic return.

Such a fastening member 12, forming the male element of the first fastening means 29, may be positioned at each corner of the frame 2.

As specified above, the first fastening means 29 also comprise fastening tabs 15 formed on the radiator 8 to interact with the fastening members 12 fixed to the frame 2. Fastening tabs 15 extend longitudinally from a header box so that they are, respectively, positioned facing a fastening member 12 as described above, when the radiator is brought to the assembly position.

Each fastening tab 15 here comprises a central cut-out 150 configured for receiving the free edges of the blades of a corresponding fastening member 12. Evidently, the cut-out is designed for forcing onto the ramps when the fastening member passes through the tab, that is to say when the radiator is moved transversely toward the frame in a first direction of insertion Ia. On completion of the translation of the radiator, the fastening tab is beyond the ramp and is positioned in the recess formed in the body of the fastening member 12 so that the member returns to its original position and the stop formed by the shoulder of the ramp locks the fastening tab, and consequently the radiator, in position.

As described above, such a fastening tab, forming the female element of the first fastening means 29, may be positioned at each vertical edge of a header box so as to correspond with a member positioned at each corner of the frame.

In the example shown in [FIG. 1], it may be noted that similar first fastening means are positioned in three of the corners of the frame, the fourth corner being provided with first fastening means which are the inverse of those being described at present, namely a male member positioned on the radiator and a fastening tab positioned on the frame, although this does not limit the invention. It is also possible to provide for some fastening points for fastening the radiator to the frame to be formed by screwing means, if these screwing means are configured for fastening the radiator in the first direction of insertion Ia as mentioned above.

It will be understood from the preceding text that the fastening of each of the lateral edges 14, 16 of the radiator 8 takes place simultaneously on the corresponding side wall of the frame, by snap-fitting, in the transverse direction T, each fastening tab 15 into the corresponding fastening member 12. "Snap-fitting" is taken to mean assembly without the possibility of reversal, by the elastic deformation of a female part under the force of insertion of a male part and by the locking of the male part by the elastic return of the female part.

As is apparent from the above text, the radiator 8 is mounted on a first face, or front face 20, of the frame 2 in a first direction of insertion Ia. The first direction of insertion Ia extends along the transverse direction T of the thermal system 1, from the outside of the thermal system 1 toward the first face of the frame 2.

[FIG. 3] shows the thermal system 1 from an angle of perspective that makes visible the rear face 22 of the frame, that is to say the face opposed to the front face 20 described above. A second heat exchanger is fastened to the rear face 22 of the frame. Here, the second heat exchanger is a condenser 10. Only the elements not detailed in [FIG. 1] will be detailed in the remainder of the description.

The condenser 10 comprises an exchange surface 100 together with a receiver-drier 38 installed laterally relative to said exchange surface, that is to say on a longitudinal edge. The receiver-drier is used for dehydrating the circuit formed in the exchange surface of the condenser 10, for neutralizing acids, for filtering fine particles, and for other purposes. In the assembled position shown in [FIG. 3], the exchange surface 100 lies across the frame, and the receiver-drier is arranged in a cavity formed in the second side wall 6b of the frame 2.

The condenser 10 comprises a proximal edge 17 formed by the receiver-drier 38, and a distal edge 21, separated from the receiver-drier 38 and opposed to the proximal edge 17 in the longitudinal direction L of the thermal system 1.

On this rear face 22 of the frame, the second side wall 6b of the frame 2 comprises three fastening pins 13, which, together with the second side wall 6b, contribute to the formation of the cavity, shown in [FIG. 5], configured for receiving the receiver-drier 38. The fastening pins 13 form transverse stop means for the receiver-drier 38 when the latter is installed in the cavity. The cavity and the fastening pins 13 are configured to allow the receiver-drier to be inserted with an angle of inclination of the condenser, of about 20° to 30° for example, relative to the main plane of elongation of this condenser when it is in the operating position and fastened to the frame. The cavity and the pins then define a seat for the pivoting of the receiver about a vertical axis so that the distal edge 21 is brought to face the first side wall 6a of the frame 2.

Evidently, the number and shape of the fastening pins 13 may vary without departure from the context of the invention, as long as that the pivoting of the condenser in the seat formed on the frame allows the distal edge 21 of the condenser to be brought to face the opposed side wall of the frame.

As specified above, the frame comprises, on a second face, that is to say its rear face as described above, second fastening means 30 configured to allow a second heat exchanger, here the condenser 10, to be fastened by insertion in a second direction of insertion Ib opposed to the first direction of insertion Ia described above for the fastening of the first heat exchanger to the first face, or front face 20, of the frame. In the remainder of the description, second fastening means 30 for fastening the condenser 10 to the frame 2 will be described, notably, with reference to [FIG. 4], which shows a close-up view of one of these second fastening means 30.

The second fastening means 30 comprise, on the one hand, the fastening pins 13 described above on the second lateral wall 6b, and, on the other hand, at least one fastening element 44 formed on the first side wall 6a of the frame in combination with a fastening lug 46 formed on the condenser. As described in relation to the first fastening means, the fastening element 44 and the fastening lug 46 are configured to allow the condenser to be fastened to the frame by snap-fitting in a transverse direction of insertion, perpendicular to the main plane of elongation of the condenser when it is assembled onto the frame.

More particularly, the fastening element 44 projects from the first side wall 6*a* of the frame 2, and comprises flexible catches 440 that can be deformed elastically to assume a position of engagement with an edge of the corresponding fastening lug 46.

The fastening lug 46 extends projectingly from the condenser in the longitudinal direction L, so that it faces the fastening element 44 of the first side wall 6*a* when the condenser has been pivoted about the axis of the receiver-drier. The fastening lug 46 has a central orifice 47 designed to receive the fastening element projecting from the frame, and at least one wall contributing to the delimitation of the central orifice is locked by the elastic return of the catch against which an edge of this wall comes to bear.

Evidently, the fastening of the condenser 10 to the second face of the frame 2, that is to say the rear face 22, takes place at the end of assembly, in a second direction of insertion Ib which extends in the transverse direction T of the thermal system 1 and in the direction opposed to the first direction of insertion of the radiator as described above. It may therefore be considered that the fastening of the condenser 10 to the frame 2 takes place by means of translational mounting, since the final step of the method of fastening the condenser consists in a mechanical push in the transverse direction T of the fastening lug 46 around the fastening element 44 to enable the condenser to be snap-fitted onto the frame.

As described above, provision may be made for some fastening points for fastening the condenser to the frame to be formed by screwing means, if these screwing means are configured for fastening the condenser in the second direction of insertion Ib.

[FIG. 5] shows the one-piece frame 2 on its own, without the heat exchangers fastened according to the invention on either side of the frame via the first and second fastening means positioned on one and the other face of the frame respectively. On at least one side wall, the one-piece frame comprises at least one sealing wall 58*a*, 58*b* which extends perpendicularly to the side wall, extending toward the inside of the frame from the corresponding side wall.

In the illustrated example, the sealing wall or walls are made in one piece with the remainder of the frame; that is to say, the walls of the frame and each sealing wall are made in one piece, the sealing wall or walls possibly being thinner than the side and longitudinal walls of the frame. According to the invention, the sealing wall or walls may be overmolded on the corresponding side wall or longitudinal wall of the frame, so that they are made of two different materials.

More particularly, the frame 2 comprises a first sealing wall 58*a*, shown notably in [FIG. 5] and [FIG. 6], on the first side wall 6*a*. The first sealing wall 58*a* extends continuously along the whole of the vertical dimension V of the corresponding side wall, substantially in the center of this wall with respect to the transverse dimension.

The first sealing wall 58*a* extends from the first lateral wall 6*a* substantially perpendicularly thereto, so as to extend substantially parallel to the main plane of elongation of the condenser or radiator. The first sealing wall 58*a* has a free edge 59*a* positioned inside the frame and arranged between the two heat exchangers along the transverse direction.

As shown in [FIG. 6], the first lateral wall 6*a* may have two parts extending over two levels, offset longitudinally, so as to be closer to the header boxes of the radiator 8 and condenser 10, the first sealing wall extending substantially perpendicularly to the first side wall 6*a* at the junction of these two parts.

[FIG. 6] also shows the position of the free edge 59*a* of the first sealing wall 58*a* in a space between the two heat exchangers, and thus shows the baffle for impeding the air flow, to the formation of which the first sealing wall contributes.

The heat exchangers, that is to say the radiator 8 fastened to the first face, or front face 20, of the frame and the condenser 10 fastened to the opposed second face of the frame, are mounted in series on the frame 2, each on a respective side of the frame, so that the air flow entering the thermal system passes through first one and then the other. [FIG. 6] and [FIG. 7] thus show the directions of insertion Ia, Ib, in other words the opposite directions, of the radiator 8 and the condenser 10 according to the invention, the directions being opposite.

The condenser 10 and the radiator 8 are mounted on the frame so as to be spaced apart at their respective exchange surfaces, in the transverse direction perpendicular to the respective planes of elongation of the heat exchangers, by a distance D1, which is advantageously between 10 and 50 mm. As illustrated, the header boxes positioned on either side of the heat exchange surfaces have a dimension in the transverse direction that is greater than the corresponding dimension of the exchange surfaces, and the distance D1 between the condenser 10 and the radiator 8 described above is provided to allow a space 70 to be formed between at least one header box of one heat exchanger and the other heat exchanger that is large enough to receive at least the free edge 59*a* of the first sealing wall 58*a* projecting from the first side wall 6*a*.

It should be noted that the free edge 59*a* does not extend longitudinally beyond the header box positioned farthest toward the inside of the frame. Thus the first sealing wall 58*a* forms a wall to impede the air flow that might leak between the heat exchangers and the first side wall, because of its presence between the exchangers. Additionally, the first sealing wall does not extend longitudinally across the air flowing through the heat exchange surface of the radiator.

On the other hand, in the example illustrated in [FIG. 5] and as shown in [FIG. 7], the frame 2 also comprises a second sealing wall 58*b* projecting from the second side wall 6*b* of the frame 2. The second sealing wall 58*b* extends continuously along the whole of the vertical dimension V of the corresponding side wall.

The second sealing wall 58*b* has a different shape from that described above for the first sealing wall 58*a*, notably owing to the presence of the cavity for accommodating the receiver-drier 38. Notably, the second sealing wall extends from a transversely offset portion of the second side wall 6*b*, and has two successive parts. A first, inclined, part 74 extends from the second lateral wall and is prolonged by a second, flat, part 76, which extends in the longitudinal direction L, substantially in a plane parallel to the main plane of elongation of radiator and of the condenser. The first, inclined, part 74 has an inclination which here is of the order of 45° relative to the longitudinal direction, although this does not limit the invention, enabling the second, flat, part to be positioned in the space 70 formed between the two heat exchangers, while avoiding the receiver-drier 38.

As described above, the free edge of the second sealing wall, formed by the second, flat, part 76, forms a wall to impede the air flow that might leak between the heat exchangers and the second side wall.

It should be noted that such a configuration of the sealing walls 58*a*, 58*b*, that is to say sealing walls made in one piece with, or overmolded on, the corresponding side wall or longitudinal wall and having their free edges extending toward the inside of the frame, at least at the position of the header boxes of the radiator 8 and of the condenser 10, is possible only because of the specific features of the mounting of the condenser 10 and the radiator 8 in opposite directions of insertion Ia and Ib, on either side of each sealing wall.

As shown in [FIG. 5], the frame 2 also comprises at least one structural wall 52, in this case two structural walls. In the illustrated example, the two structural walls 52 take the form of walls extending perpendicularly between first longitudinal wall 4*a* and the second longitudinal wall 4*b*. If the heat exchangers are mounted on the frame of the thermal device, the structural wall or walls are configured to extend into the space 70 formed in the transverse direction between the heat exchangers, that is to say the condenser 10 and the radiator 8.

In a variant that is not shown, the two structural walls 52 may extend perpendicularly to the side walls 6*a*, 6*b*. It should be noted that the arrangement shown, that is to say structural walls extending from one longitudinal wall to the other, enables the structural walls 52 not to interfere with the sealing walls 58*a*, 58*b* positioned projectingly from the side walls 6*a*, 6*b*.

The structural walls 52 serve to reinforce the structure of the frame 2, and also to facilitate the assembly of the thermal system, by acting as a stop, if required, during the positioning of the radiator and the condenser in the frame 2 in opposite directions of insertion.

[FIG. 5] also shows a reinforcing bar 50 positioned to form a right angle in each of the corners 31, 32, 34, 36. The reinforcing bars 50 can reinforce the structure of the frame 2, and notably that of the sealing walls arranged perpendicularly and projectingly from each of the side walls, not only during the assembly of the thermal system but also in the course of its use in a motor vehicle. Thus the invention achieves its stated aim of improving the sealing of the thermal system by mounting different heat exchangers on the same one-piece frame in opposite directions of insertion. By mounting the heat exchangers in opposite directions of insertion, it is possible to provide the best control of the chains of assembly dimensions in order to ensure the position of the exchangers with respect to the frame, while also leaving a space between the two heat exchangers. By mounting in this way it is also possible to form, on this one-piece frame, sealing means that are fixed to the frame before the mounting of the exchangers and are designed to extend at least partially into a space located between the two heat exchangers. Thus an effective sealing function is provided, enabling air leaks between the heat exchangers and the frame to be limited, because of the free edge of the sealing gasket that extends into an area defined between the heat exchangers and forms an effective baffle.

However, the invention is not to be considered as being limited solely to the means and configurations described and illustrated, but is equally applicable to any equivalent means or configurations and to any combination of such means or configurations. Notably, the invention described here may notably be applied in a thermal system for an electric motor vehicle, given that it may be applied to any shape and/or size of thermal system incorporated in any type of motor vehicle, electric or otherwise. Furthermore, different fastening means may be used without departing from the context of the invention, provided that they allow a first exchanger to be fastened to a one-piece frame from a first side of the thermal system and allow a second exchanger to be fastened to the same one-piece frame from a second side of the thermal system.

The invention claimed is:

1. A thermal system for a motor vehicle, comprising:
a one-piece frame comprising:
two side walls parallel to each other;
two longitudinal walls parallel to each other and extending perpendicularly with respect to the two side walls;
a front face,
a rear face,
fastening means for a first heat exchanger and a second heat exchanger on the front face and the rear face,
a plurality of sealing walls projecting from and along an entire dimension of the two side walls, each of the plurality of sealing walls extend substantially perpendicular to a corresponding side wall and substantially in a plane parallel to a main plane of elongation of the first and second heat exchangers, and
a reinforcing bar extending in a space formed transversely between the first and second heat exchangers and connecting the two longitudinal walls without overlapping said sealing walls,
said sealing walls comprising at least one free edge extending in the space formed transversely between the first and second heat exchangers,
said sealing walls forming an obstruction to air flow attempting to escape from the sides of the thermal system without blocking circulation of the air flow through the center of the first and second heat exchangers,
wherein said fastening means being such that first fastening means positioned on the front face of the frame are configured for fastening the first heat exchanger in a first direction of insertion, and second fastening means positioned on the rear face of the frame are configured for fastening the second heat exchanger in a second direction of insertion opposed to the first direction of insertion, and
wherein one or more sealing walls of the plurality of sealing walls comprise an inclined part and a flat part.

2. The thermal system as claimed in claim 1, wherein the first fastening means and the second fastening means are configured for fastening their respective heat exchangers to the frame in a transverse direction, perpendicular to a main plane of elongation of the heat exchangers in a fixed position on the frame.

3. The thermal system as claimed in claim 2, wherein the first fastening means and the second fastening means comprise snap-fitting fastening means, with at least one fastening means which is elastically deformable in a direction perpendicular to the transverse direction and comprises a stop capable of locking the transverse position of a corresponding heat exchanger on the frame.

4. The thermal system as claimed in claim 1, wherein at least one sealing wall extends in a plane parallel to a main plane of elongation of the heat exchangers fastened to the frame.

5. The thermal system as claimed in claim 1, wherein at least one sealing wall is made in one piece with the frame.

6. The thermal system as claimed in claim 1, wherein the frame comprises at least one structural wall extending between the two longitudinal walls or the two side walls of the frame, and between the at least two heat exchangers.

7. The thermal system as claimed in claim 6, wherein the first and second heat exchangers are a condenser placed on the rear face of the frame and a radiator placed on the front face of the frame, the condenser and the radiator being positioned in series in a transverse direction of an air flow through the thermal system.

8. A motor vehicle comprising at least one thermal system as claimed in claim 1.

9. The thermal system as claimed in claim 1, wherein the reinforcing bar facilitates assembly of the thermal system by acting as a stop during positioning of the first and second heat exchangers in the one-piece frame in opposite directions of insertion.

10. A method for assembling a thermal system, comprising:

positioning a first heat exchanger on a front face of a one-piece frame in a first direction of insertion;

positioning a second heat exchanger on a rear face of the frame in a second direction of insertion, the first and second directions of insertion and being opposed to each other;

fastening the first and second heat exchangers to the frame via fastening means provided on the frame, the fastening means being configured in the respective directions of insertion of the first and second heat exchangers;

wherein the one-piece frame further comprises:

two side walls parallel to each other;

two longitudinal walls parallel to each other and extending perpendicularly with respect to the two side walls;

a plurality of sealing walls projecting from and along an entire dimension of the two side walls, each of the plurality of sealing walls extend substantially perpendicular to a corresponding side wall and substantially in a plane parallel to a main plane of elongation of the first and second heat exchangers, and a reinforcing bar extending in a space formed transversely between the first and second heat exchangers and connecting the two longitudinal walls without overlapping said sealing walls, said sealing walls comprising at least one free edge extending in the space formed transversely between the first and second heat exchangers, said sealing walls forming an obstruction to air flow attempting to escape from the sides of the thermal system without blocking circulation of the air flow through the center of the first and second heat exchangers; and wherein one or more sealing walls of the plurality of sealing walls comprises an inclined part and a flat part.

11. The method as claimed in claim 10, wherein the reinforcing bar facilitates assembly of the thermal system by acting as a stop during positioning of the first and second heat exchangers in the one-piece frame in opposite directions of insertion.

* * * * *